Patented May 24, 1938

2,118,493

UNITED STATES PATENT OFFICE 2,118,493

MANUFACTURE OF ANILINE DERIVATIVES

Samuel Coffey and Norman Hulton Haddock, Blackley, Manchester, England, assignors to Imperial Chemical Industries Limited, a corporation of Great Britain No Drawing. Application December 29, 1936, Serial No. 118,175. In Great Britain December 31, 1935

3 Claims. (Cl. 260—130.5)

This invention relates to the manufacture of derivatives of aniline and more particularly to those carrying as nuclear substituents alkyl radicals having from 10–18 carbon atoms.

Beran (Ber., der deutschen Chem. Ges., 1885, 18, 131 et seq.) has made p-octylaniline and p-caprylaniline, (which are alkyl substituted anilines in which the alkyl substituents have 8 and 7 carbon atoms respectively) by heating octyl and capryl alcohols with the double compound obtained from two molecules of aniline and one of zinc chloride, but the yields were only small, namely 15–20% calculated on the alcohols. He also made them by heating the alcohols with aniline hydrochloride, but obtained low yields this way also, in fact barely 10% from capryl alcohol.

This invention has as an object the disclosure of methods whereby new derivatives of aniline carrying as nuclear substituents alkyl radicals having from 10–18 carbon atoms can be manufactured. A further object is to disclose new methods whereby such aniline derivatives can be manufactured. A still further object is to disclose new methods whereby such derivatives of aniline as are known can be manufactured with better yields and greater ease and economy. A still further object is to produce such new derivatives of aniline. Further objects will appear hereafter.

These objects are accomplished by the following invention. We have discovered that we can make such derivatives by heating aniline, or aniline substituted by methyl or chloro substituents or both, with saturated primary aliphatic alcohols having 10–18 carbon atoms and a halide of zinc or cobalt; or alternatively, by heating an aniline, carrying as N-substituent one of the above alkyl radicals, and which is otherwise unsubstituted or else also carries methyl or chloro substituents or both, with a halide of zinc or cobalt. The N-substituted aniline may be wholly or partly replaced by its hydrochloride or hydrobromide or partly replaced by the hydrochloride or hydrobromide of the parent aniline.

The following examples in which parts are by weight illustrate but do not limit the invention.

Example 1

558 parts of dodecyl alcohol, 280 parts of aniline, 130 parts of aniline hydrochloride and 245 parts of zinc chloride are heated together up to 240° C. during 10 hours. Heating is then continued for 12 hours at 240° C. The mixture is boiled with an excess of sodium hydroxide solution until the zinc chloride double compound is decomposed, the oil is separated, dried with warm 30% sodium hydroxide liquor at 50° C. and distilled in vacuo, the portion distilling at 200–235° C./11 mm. being collected. A good yield is obtained. p-Dodecylaniline is a white crystalline substance, which has a crystallizing point of 35° C. and boiling point of 220–221° C. at 15 mm. pressure and has the formula

Its acetyl derivative melts at 100° C.

Example 2

185 parts of aniline, 352 parts of dodecyl alcohol, 288 parts of cobalt chloride crystals (CoCl₂6H₂O) and 87 parts of aniline hydrochloride are heated together at 200–240° C. over 10 hours. During this time water distils off and the cobalt chloride passes into solution, giving a bright bluish-green mixture. Heating is continued for a further 12 hours at 235–240° C. and the mixture then poured into excess of sodium hydroxide solution. The resulting mixture is boiled for an hour, whereupon the cobalt complexes are decomposed and the crude dodecylaniline floats as an oil on an aqueous suspension of cobalt hydroxide. The oil is separated by decantation and filtration, dried, and distilled in vacuo, the portion distilling at 200–235° C./11 mm. being collected. p-Dodecylaniline is obtained in good yield.

Example 3

261 parts of N-dodecylaniline, 40 parts of aniline hydrochloride and 70 parts of zinc chloride are heated together for 16 hours at 235–245° C. for 16 hours. The mixture is boiled with an excess of sodium hydroxide until the zinc chloride double compound is decomposed, the oil is separated, dried, and distilled in vacuo, the portion distilling at 200–235° C./11 mm. being collected. p-Dodecylaniline is obtained in good yield.

N-dodecylaniline is a known compound although its preparation has not been described. This preparation may be effected as follows.

186 parts of dodecyl alcohol, 186 parts of aniline and 130 parts of aniline hydrochloride are heated together at 180–200° C. until water no longer distils from the reaction mixture (about 16 hours). The latter is then basified, the oil separated and distilled in vacuo. N-dodecylaniline distils at 200–220° C./12 mm. (crystallizing point 23–24° C.). The yield is nearly theoretical;

pure N-dodecylaniline boils at 210° C./12 mm. and has a crystallizing point of 26.5° C.

Example 4

130 parts of N-dodecylaniline, 50 parts of N-dodecylaniline hydrochloride and 47 parts of zinc chloride are heated together at 240° C. for 16 hours. The reaction mixture is then treated with sodium hydroxide, dried, and distilled in vacuo as in Example 3. p-Dodecylaniline is obtained in good yield.

Example 5

390 parts of N-dodecylaniline and 170 parts of zinc bromide are heated together at 240° C. for 16–20 hours. The mixture is then boiled with excess of sodium hydroxide until the zinc bromide double compound is decomposed. The oil is separated, dried, and distilled in vacuo, the portion distilling at 200–235° C./11 mm. being collected in good yield. p-Dodecylaniline is obtained.

Example 6

A mixture of 520 parts of N-dodecylaniline, 290 parts of cobalt chloride crystals (CoCl₂6H₂O) and 87 parts of aniline hydrochloride is heated at 240° C. for 16 hours, during which time the solids pass into solution. The melt is cooled to 180–190° C., poured into excess of 10% sodium hydroxide solution and boiled for one hour, whereupon the cobalt complexes are decomposed and the crude dodecylaniline floats as an oil on an aqueous suspension of cobalt hydroxide. The oil is separated, dried, and distilled in vacuo, the portion distilling at 200–235° C./11 mm. being collected. p-Dodecylaniline is obtained in good yield.

Example 7

372 parts of dodecyl alcohol, 214 parts of o-toluidine, 95.7 parts of o-toluidine hydrochloride and 180 parts of zinc chloride are heated to 200° C. for 8 hours and at 240° C. for 12 hours. The product is treated with sodium hydroxide solution as described in Example 1 and the oil dried and distilled in vacuo. 5-dodecyl-o-toluidine (CH₃=1) is obtained in good yield as a colourless solid, crystallizing point 36° C., and has the formula

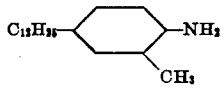

The pure compound, which is obtained by distillation, has a crystallizing point of 38.5° C.

Example 8

372 parts of dodecyl alcohol, 214 parts of p-toluidine, 95.7 parts of p-toluidine hydrochloride and 180 parts of zinc chloride are heated at 240° C. for 24 hours. The mixture is boiled with an excess of sodium hydroxide solution until the zinc chloride double compound is decomposed, the oil is separated, dried, and distilled in vacuo, the portion distilling at 215–218° C./12 mm. being collected. The product, which appears to be 3-dodecyl-p-toluidine (CH₃=1) is an oil, and apparently has the formula

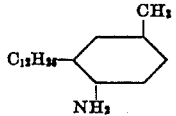

It yields a crystalline hydrochloride and an acetyl derivative which is in the form of colourless needles and melts at 102–3° C.

Example 9

279 parts of dodecyl alcohol, 192 parts of o-chloroaniline, 84 parts of o-chloroaniline hydrochloride and 123 parts of zinc chloride are heated up to 200–240° C. in 10 hours and then kept at 240° C. for 12 hours and the product worked up as described in Example 1. p-Dodecyl-o-chloroaniline is thus obtained in good yield as an oil, B. P. 210° C./12 mm. and has the formula

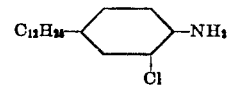

Example 10

190 parts of decyl alcohol, 112 parts of aniline, 54 parts of aniline hydrochloride and 102 parts of zinc chloride are heated together up to 235–240° C. during 10 hours and kept at 240° C. for 14 hours. The product is worked up as described in Example 1. p-Decylaniline is obtained as a colourless oil, B. P. 210–220° C./12–14 mm., which sets to a solid with a crystallizing point of 17° C. and has the formula

Its acetyl derivative melts at 102° C.

Example 11

306 parts of crude myristyl alcohol (obtained from fractionation of the alcohols from coconut oil fatty acids), 140 parts of aniline, 65 parts of aniline hydrochloride and 121 parts of zinc chloride are heated together up to 230° C. during 10 hours and kept at 230–240° C. for 10 hours. The product is treated with sodium hydroxide as described in Example 1, dried, and the oil fractionated. Crude tetradecylaniline B. P. 180–220° C./2 mm. is obtained in good yield and with a crystallizing point of 33.5° C. Pure p-tetradecylaniline can be obtained by redistillation and has a crystallizing point of 41.5° C. and has the formula

The acetyl derivative is a colourless solid, M. P. 103° C.

Example 12

876 parts of cetyl alcohol, 335 parts of aniline, 156.5 parts of aniline hydrochloride and 324 parts of zinc chloride are heated together and the product isolated as described in Example 1. p-Hexadecylaniline is obtained in good yield, B. P. 200–210° C./2 mm., crystallizing point 45° C. Pure p-hexadecylaniline, obtained through its zinc chloride double salt, has a crystallizing point of 48° C. and has the formula

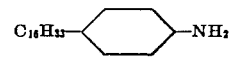

Its acetyl derivative melts at 104° C.

Example 13

200 parts of technical octadecyl alcohol (a mixture of hexa and octadecyl alcohols), 70 parts of aniline and 50 parts of zinc chloride are heated at 230–240° C. for 16 hours, and the product is isolated as described in Example 1. Crude p-octadecylaniline, B. P. 280–290° C./20 mm. is obtained. The pure p-octadecylaniline would have the formula

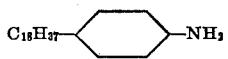

*Example 14*

558 parts of technical "lorol" (i. e. fatty alcohols $C_{10}$–$C_{18}$ from coconut oil fatty acids, boiling range, 5–90%—261–305°), 279 parts of aniline, 130 parts of aniline hydrochloride and 245 parts of zinc chloride are heated together to 200° C. in 2 hours and to 240° C. in 6 hours, the temperature then being kept at 240° C. for 16 hours. The melt is then cooled to 200° C. and poured while still molten into 1000 parts of sodium hydroxide solution (d. 1.37). The mixture is boiled for 2–3 hours vigorously until the zinc chloride double salts are decomposed and the crude alkylanilines are separated. The crude bases are then distilled in vacuo and the fraction boiling at 200–297° C./17 mm. collected. The yield is 500 parts and the product is a pale yellow oil consisting mainly of p-alkylanilines in which the alkyl group contains from 10–18 carbon atoms, which solidifies to a low melting semi-solid at room temperature.

In Examples 3, 4, 5, and 6 we could use instead of N-dodecylaniline any other aniline carrying as N-substituent an alkyl radical having from 10–18 carbon atoms, if it is otherwise unsubstituted or if it carries methyl or chloro substituents or both.

The N-substituted aniline may be wholly or partly replaced by its hydrochloride or hydrobromide or partly replaced by the hydrochloride or hydrobromide of the parent aniline.

Examples of alcohols which may be used according to this invention are decyl, otherwise known as decanol, dodecyl tetradecyl, hexadecyl and octadecyl alcohols. Hexadecyl alcohol is the main or sole component of the alcohols obtained by the saponification of spermaceti. If the alcohol obtained by the saponification of spermaceti is regarded as hexadecyl alcohol, its purity will depend upon the purity of the spermaceti which has been saponified. With low grade spermaceti the alcohol obtained is a mixture. When the term cetyl is used in this specification, it does not necessarily refer to pure cetyl alcohol, i. e. pure hexadecyl alcohol. The invention is not limited to the use of the particular alcohols just mentioned, although in practice it will be found that its practical application is at present for economic reasons limited to the use of alcohols containing an even number of carbon atoms. Dodecyl and tetradecyl or myristyl alcohols are obtained by the reduction of the mixed fatty acids obtained from coconut oil and palm oil. Other alcohols are likewise obtainable by reduction of the fatty acids of natural fats and oils (see here for instance, Bouveault and Blanc, Bull. Soc. Chem., Series 3, vol. 31, pages 674 et seq. and 1210 et seq. The invention includes the use of mixed alcohols, for instance technical "lorol", the mixed alcohols from coconut oil fatty acids. Instead of the chlorides and bromides of zinc and cobalt we could use any halide.

The new aniline derivatives are valuable intermediates for the manufacture of dyestuffs see for example British specification 443,776, and by this process are obtained in good yields of about 60–70%.

As many apparently widely different embodiments of this invention may be made without departing from the spirit and scope thereof, it is to be understood that we do not limit ourselves to the specific embodiments thereof except as defined in the appended claims.

We claim:

1. The process for the manufacture of alkylated aniline compounds carrying as nuclear substituents alkyl radicals having 10 to 18 carbon atoms which comprises mixing a saturated primary aliphatic alcohol having 10 to 18 carbon atoms, a metal halide of the group consisting of zinc halides and cobalt halides and an aniline compound from the group consisting of aniline, the methyl and chloro nuclear substituted derivatives of aniline, anilines having as N-substituent an alkyl radical of 10 to 18 carbon atoms and the methyl and chloro nuclear substituted derivatives of said N-substituted anilines; heating the mixture until a metal complex of a para-alkyl-aniline compound is formed; adding sufficient of an alkali metal hydroxide solution to extract metal salts from said metal complex and heating until the metal salts are extracted and an oil containing said alkylated aniline is formed; and separating the oil from the reaction mixture.

2. The process in accordance with claim 1 in which the aniline compound in said reaction mixture is replaced in part by a hydrohalide from the group consisting of the hydrochlorides of said aniline compounds and the hydrobromides thereof.

3. Process of making p-dodecylaniline which comprises mixing dodecyl alcohol, zinc chloride, aniline and aniline hydrochloride, heating the mixture until a metal complex of zinc and p-dodecylaniline is formed, adding sufficient of an alkali metal hydroxide solution to extract metal salts from said metal complex and heating until the metal salts are extracted and an oil containing p-dodecylaniline is formed, and separating the oil from the reaction mixture.

SAMUEL COFFEY.
NORMAN HULTON HADDOCK.